(12) United States Patent
O'Rear et al.

(10) Patent No.: US 8,906,228 B2
(45) Date of Patent: Dec. 9, 2014

(54) PROCESS, METHOD, AND SYSTEM FOR REMOVING HEAVY METALS FROM FLUIDS

(71) Applicants: Dennis O'Rear, Petaluma, CA (US); Russell Cooper, Martinez, CA (US); Sujin Yean, Houston, TX (US)

(72) Inventors: Dennis O'Rear, Petaluma, CA (US); Russell Cooper, Martinez, CA (US); Sujin Yean, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 207 days.

(21) Appl. No.: 13/714,512

(22) Filed: Dec. 14, 2012

(65) Prior Publication Data
US 2013/0168293 A1  Jul. 4, 2013

Related U.S. Application Data

(60) Provisional application No. 61/582,021, filed on Dec. 30, 2011.

(51) Int. Cl.
| | | |
|---|---|---|
| *C10G 17/00* | (2006.01) | |
| *C10G 17/10* | (2006.01) | |
| *C10G 17/02* | (2006.01) | |
| *C10G 17/08* | (2006.01) | |
| *C10G 27/04* | (2006.01) | |
| *C10G 27/08* | (2006.01) | |
| *C10G 27/02* | (2006.01) | |
| *C10G 27/12* | (2006.01) | |
| *C10G 27/14* | (2006.01) | |
| *C10G 53/14* | (2006.01) | |

(52) U.S. Cl.
CPC ............... *C10G 27/02* (2013.01); *C10G 27/04* (2013.01); *C10G 27/12* (2013.01); *C10G 27/14* (2013.01); *C10G 53/14* (2013.01)
USPC ........................................................ 208/251 R

(58) Field of Classification Search
CPC ........ C10G 27/02; C10G 27/04; C10G 27/12; C10G 27/14; C10G 53/14
USPC ........................... 208/251 H, 251 R, 252, 253
See application file for complete search history.

(56) References Cited

U.S. PATENT DOCUMENTS

| 6,268,543 B1 | 7/2001 | Sakai et al. |
| 2010/0032344 A1 | 2/2010 | Cross et al. |

FOREIGN PATENT DOCUMENTS

| JP | 01-188588 | 7/1989 |
| JP | 2000-212576 | 10/1999 |
| WO | 2010-116165 | 10/2010 |

OTHER PUBLICATIONS

Written Opinion of the International Searching Authority for International application No. PCT/US2012/069682 dated Apr. 25, 2013, 5 pages.

*Primary Examiner* — Walter D Griffin
*Assistant Examiner* — Derek Mueller

(57) ABSTRACT

Trace amount levels of heavy metals such as mercury in crude oil are reduced by contacting the crude oil with an oxidizing agent and then with a reducing agent. In one embodiment, the oxidizing agent is selected from the group of hydroperoxides, organic peroxides, inorganic peracids and salts thereof, organic peracids and salts thereof, halogens such as iodine ($I_2$), bromine ($Br_2$), and ozone. The treatment converts non-volatile mercury in the crude oil into a volatile form for subsequent mercury removal by any of stripping, scrubbing, adsorption, and combinations thereof. In one embodiment, at least 50% of the mercury is removed. In another embodiment, the removal rate is at least 99%.

24 Claims, No Drawings

PROCESS, METHOD, AND SYSTEM FOR REMOVING HEAVY METALS FROM FLUIDS

CROSS-REFERENCE TO RELATED APPLICATIONS

This application claims benefit under 35 USC 119 of US Provisional Patent Application No. 61/582,021 with a filing date of Dec. 30, 2011. This application claims priority to and benefits from the foregoing, the disclosure of which is incorporated herein by reference.

TECHNICAL FIELD

The invention relates generally to a process, method, and system for removing heavy metals such as mercury and the like from hydrocarbon fluids such as crude oil.

BACKGROUND

Heavy metals such as lead, zinc, mercury, silver, arsenic and the like can be present in trace amounts in all types of hydrocarbon streams such as crude oils. The amount can range from below the analytical detection limit (0.5 µg/kg) to several thousand ppbw (parts per billion by weight) depending on the source. It is desirable to remove the trace amounts of these metals from crude oils.

Various methods to remove trace metal contaminants in liquid hydrocarbon feed such as mercury have been disclosed. In U.S. Pat. No. 6,350,372 B1, a liquid hydrocarbon feed is mixed with a miscible sulfur compound and then placed in contact with a fixed bed absorbent for removal of at least a portion of the mercury on an elemental basis. U.S. Pat. No. 4,474,896 discloses the use of absorbent compositions, e.g., polysulfide based, for removal of elemental mercury (Hg) from gaseous and liquid hydrocarbon streams. U.S. Pat. Publication Nos. 2010/0032344 and US2010/0032345 describe processes to remove elemental mercury $Hg^0$ from crude oil consisting of stripping the mercury-contaminated crude with gas in a heated vessel, and then removing the mercury from the stripped gas in an adsorption bed. There are also a number of commercially available processes and products for the removal of elemental mercury $Hg^0$ from hydrocarbon streams including but not limited to ICI Synetix' Merespec™ fixed bed absorbents, UOP's HgSIV™ HgSIV™ regenerative mercury removal adsorbents, and Johnson Matthey's Puraspec™ and Puracare™ granulated absorbents for the removal of mercury from naphtha and/or gaseous hydrocarbon streams.

Studies have been conducted to measure mercury levels in crude oil as well as the percentage of mercury in the forms of particles, which can be removed by filtration. It was shown that in crude oils containing more than 50 ppbw mercury, the percent mercury in particles is over 25% with an average of 66%. It was also shown that in most samples of crude oils and condensates, the predominant form of mercury is non-volatile (e.g., mercuric sulfide or other insoluble mercury compound) and not in the form of elemental mercury $Hg^0$. It is well known in the art that elemental mercury is readily removed from hydrocarbons upon stripping or sparging with a low mercury gas stream.

US Patent Application Nos. 2010/0032344 and 2010/0032345 disclose a process for removing elemental mercury concentration with a liquid/gas contactor, with simulations showing 90% mercury removal at a pressure from <1 to −3 Bars and a temperature of greater than 150° C., conditions common at crude oil well sites. It is indicated that the liquid/gas contact is carried out in a vessel that provides direct contact of the treated gas stream with the liquid hydrocarbon stream without contacting any other materials or devices, giving 90% removal rate.

As adsorption technology does not work well for crude oils and condensates with low levels of mercury, and particularly crude oils containing the non-volatile form of mercury, which has not been well addressed in the prior art. There is a need for improved methods for the removal of mercury from liquid hydrocarbon steams, particularly non-volatile form of mercury.

SUMMARY OF THE INVENTION

In one aspect, the invention relates to an improved method to treat a crude oil to reduce its mercury concentration. The method comprises: mixing into the crude oil an effective amount of an oxidizing agent; mixing into the crude oil an effective amount of a reducing agent to convert at least a portion of the non-volatile mercury into a volatile mercury; and removing the volatile mercury by at least one of stripping, scrubbing, adsorption, and combinations thereof to obtain a crude oil have a reduced concentration of non-volatile mercury which is less than 50% of the first concentration of non-volatile mercury.

In another aspect, the invention relates to an improved process to removal mercury from a crude oil stream containing mercury. In the process to be improved, the process comprises the steps of: a) providing a crude oil stream containing mercury from a crude oil well; b) separating said crude oil stream into a gaseous hydrocarbon stream comprising hydrocarbons, mercury and water, and a liquid hydrocarbon stream comprising hydrocarbons and elemental mercury; c) charging a mercury-containing gas feed, including in part at least a portion of said gaseous hydrocarbon stream, to a mercury removal unit for removal of mercury from said mercury-containing gas feed, thereby forming a treated gas stream; d) contacting a recycle gas stream comprising a portion of said treated gas stream with at least a portion of said liquid hydrocarbon stream for transfer of at least a portion of the elemental mercury contained in said liquid hydrocarbon stream to said recycle gas stream; thereby forming a mercury rich gas stream, and a treated liquid hydrocarbon stream; and e) passing said mercury rich gas stream to said mercury removal unit as a portion of said mercury-containing gas feed. The improvement comprises converting at least at portion of the mercury in the crude oil stream into volatile mercury, wherein the improvement comprising mixing into the crude oil stream an effective amount of an oxidizing agent; mixing into the crude oil stream an effective amount of a reducing agent to convert at least a portion of the mercury into a volatile mercury; and wherein the mixing into the crude oil stream is prior to separating the crude oil stream into a gaseous hydrocarbon stream and a liquid hydrocarbon stream.

DETAILED DESCRIPTION

The following terms will be used throughout the specification and will have the following meanings unless otherwise indicated.

"Crude oil" refers to petroleum crude oil that is originates from an underground or undersea reservoir. As used herein, the term crude refers to both crude oil and condensate. Crude, crude oil, crudes and crude blends are used interchangeably and each is intended to include both a single crude and blends of crudes. Crude oils can also be blended with "Hydrocarbon Material." "Hydrocarbon material" refers to a pure compound or mixtures of compounds containing hydrogen and carbon and optionally sulfur, nitrogen, oxygen, and other elements. Examples include synthetic crude oils, petroleum products such as gasoline, jet fuel, diesel fuel, lubricant base oil, solvents, and alcohols such as methanol and ethanol.

In one embodiment, crude oil has a specific gravity of at least 0.75 at a temperature of 60° F. In another embodiment, the specific gravity is at least 0.85. In a third embodiment, the specific gravity is at least 0.90. In one embodiment, the crude oil to be treated is in the form of a mixture of crude oil and water produced from a hydrocarbon reservoir (or, . . . oil and water from an oil and gas production well). The water-to-oil ratio increases with the age of the crude oil source, as the production of oil declines with the age of the well. For some sources, the crude stream to be treated may contain little if any produced water. For some other sources, the amount of produced water can be as much as 98% of the crude stream to be treated. Crude oil feed to be treated refers to both crude oil by itself as well as crude oil-water mixtures.

"Heavy metals" refers to gold, silver, mercury, osmium, ruthenium, uranium, cadmium, tin, lead, and arsenic. In one embodiment, "heavy metals" refers to mercury.

"Trace amount" refers to the amount of heavy metals in the crude oil. The amount varies depending on the crude oil source and the type of heavy metal, for example, ranging from a few ppb to up to 30,000 ppb for mercury and arsenic.

"High mercury crude" refers to a crude with 50 ppbw or more of mercury, e.g., 100 ppbw or more of mercury; or 250 ppbw or more of mercury.

"Mercury sulfide" may be used interchangeably with HgS, referring to mercurous sulfide, mercuric sulfide, or mixtures thereof. Normally, mercury sulfide is present as mercuric sulfide with a stoichiometric equivalent of one mole of sulfide ion per mole of mercury ion.

"Percent volatile mercury" in one embodiment is measured by stripping 15 ml of crude or condensate with 300 ml/min of nitrogen ($N_2$) for one hour. For samples which are fluid at room temperature, the stripping is carried out at room temperature. For samples which have a pour point above room temperature, but below 60° C., the stripping is done at 60° C. For samples which have a pour point above 60° C., the stripping is at 10° C. above the pour point.

"Predominantly non-volatile (mercury)" in the context of crudes refers crudes for which less than approximately 50% of the mercury can be removed by stripping, e.g., crudes for which less than approximately 25% of the mercury can be removed by stripping; or crudes for which less approximately 15% of the mercury can be removed by stripping.

"Percent particulate mercury" in one embodiment refers to the portion of mercury removed from the crude oil by centrifugation or filtration. After the centrifugation the sample for mercury analysis is obtained from the middle of the hydrocarbon layer. The sample is not taken from sediment, water or rag layers. The sample is not shaken or stirred after centrifugation. In one embodiment, percent particulate mercury is measured by by filtration using a 0.45 micron filter or by using a modified sediment and water (BS&W) technique described in ASTM D4007-11. The sample is heated in accordance with the procedure. If the two methods are in disagreement, the modified basic BS&W test is used. The modifications to the BS&W test includes: omission of dilution with toluene; demulsifier is not added; and the sample is centrifuged only two times with the water and sediments values measured after each time.

"Halogens" refers to diatomic species from the column of the periodic table headed by fluorine, for example $F_2$, $Cl_2$, $Br_2$, $I_2$, etc.

"Halogen oxides" refers to molecules which combine one or more halogen atoms and oxygen, for example NaClO, $ClO_2$, $NaClO_4$.

"Hg-Particulate crude" refers to a crude that contains 25% or more of its mercury content as particulate mercury.

"Predominantly Hg-particulate crude" refers to a crude that contains 50% or more mercury as particulate mercury, e.g., crudes with >65% or more mercury as particulate mercury; or >75% or more mercury as particulate mercury, or >90% or more mercury as particulate mercury.

"Organic peracids" refers to multiple-carbon organic compounds where the —OH in an acid group has been replaced with a —OOH group, e.g. a compound of the general formula RCO—OOH. Examples include but are not limited to peracetic acid, perbenzoic acid, meta-chloroperoxybenzoic acid and combinations thereof.

"Inorganic peracids" refers to compounds of sulfur, phosphorous, or carbon where the —OH in an acid group has been replaced with a —OOH group. Examples include but are not limited to peroxydiphosphoric acid, $H_4P_2O_8$ and peroxydisulfuric acid, $H_2S_2O_8$, sodium percarbonate $Na_2CO_3 \cdot 1.5H_2O_2$, sodium peroxydisulfate $Na_2S_2O_8$, potassium peroxydisulfate $K_2S_2O_8$, ammonium peroxydisulfate $(NH_4)_2S_2O_8$, and combination thereof.

Crudes may contain small amounts of heavy metals such as mercury and/or arsenic. In one embodiment, mercury may be present as elemental mercury $Hg^0$, ionic mercury, inorganic mercury compounds, and/or organic mercury compounds. Examples include but are not limited to: mercuric halides (e.g., HgXY, X and Y could be halides, oxygen, or halogen-oxides), mercurous halides (e.g., $Hg_2XY$, X and Y could be halides, oxygen, or halogen-oxides), mercuric oxides (e.g., HgO), mercuric sulfide (e.g., HgS, meta-cinnabar and/or cinnabar), mercuric sulfate ($HgSO_4$), mercurous sulfate ($Hg_2SO_4$), mercury selenide (e.g., $HgSe_2$, $HgSe_8$, HgSe), mercury hydroxides, and organo-mercury compounds (e.g., alkyl mercury compounds) and mixtures of thereof. Mercury can be present in volatile form as well as non-volatile form. In the non-volatile form, mercury can be present in dissolved form, as particles, and/or adsorbed onto particulate surfaces such as clay minerals, inorganic mineral scale, sand, and asphaltenes.

In the invention, crude oil is effectively treated to decrease trace levels of a heavy metal such as mercury. Mercury can be present in crudes in volatile form (e.g., elemental mercury, mercuric chloride, etc.) as well as non-volatile form. In the non-volatile form, mercury can be present in dissolved form, as particles, and/or adsorbed onto the surfaces such as clay minerals, inorganic mineral scale, sand, and asphaltenes. Non-volatile mercury makes up at least 25% of the total mercury in the crude in one embodiment; at least 50% in a second embodiment; and at least 66% in a third embodiment.

In one embodiment, the crude oil contains at least a portion of mercury (>25% of total mercury present) in non-volatile form, wherein mercury is converted to elemental mercury $Hg^0$ by treatment by at least an oxidant and at least a reductant. After the non-volatile form of mercury is converted to a volatile form, e.g., $Hg^0$, it can be removed by stripping into a gas followed by adsorption. In another embodiment, the volatile mercury can be adsorbed directly from the treated crude oil.

Oxidizing Agent:

The oxidant can be an organic oxidizing agent, an inorganic oxidant, or a mixture of oxidants. The oxidant can be employed in any form of a powder, slurry, aqueous form, a gas, a material on a support, or combinations thereof.

In one embodiment, the oxidant is selected from the group of halogens, halogen oxides, molecular halogens, peroxides and mixed oxides, including oxyhalites, their acids and salts thereof In another embodiment, the oxidant is selected from the group of peroxides (including organic peroxides) such as hydrogen peroxide ($H_2O_2$), sodium peroxide, urea peroxide, alkylperoxides, cumene hydroperoxide, t-butyl hydroperoxide, benzoyl peroxide, cyclohexanone peroxide, dicumyl peroxide. In yet another embodiment, the oxidant is selected from the group of inorganic peracids such as Caro's acid ($H_2SO_5$) or salts thereof, organic peracids, such as aliphatic $C_1$-to $C_4$-peracids and, optionally substituted, aromatic percarboxylic acids, peroxo salts, persulfates, peroxoborates, or sulphur peroxo-compounds substituted by fluorine, such as $S_2O_6F_2$, and alkali metal peroxomonosulfate salts. Suitable oxygen-containing oxidizing agents also include other active oxygen-containing compounds, for example ozone. In one embodiment, the oxidant is selected from the group of monopersulfate, alkali salts of peroxide like calcium peroxide, and peroxidases that are capable of oxidizing iodide.

In another embodiment, the oxidizing agent is selected from the group of sodium perborate, potassium perborate, potassium peroxymonosulfate, sodium peroxocarbonate, sodium peroxodicarbonate, and mixtures thereof In another embodiment, the oxidizing agent is hydrogen peroxide in the form of an aqueous solution containing 1% to 60% hydrogen peroxide (which can be subsequently diluted as needed). In another embodiment, the oxidizing agent is $H_2O_2$ in the form of a stable aqueous solution having a concentration of 16 to 50%. In a third embodiment, the oxidizing agent $H_2O_2$ is used as a solution of 1-3% concentration.

In one embodiment the oxidant selected is a hypochlorite, e.g., sodium hypochlorite, which is commercially produced in significant quantities. The hypochlorite solution in one embodiment is acidic with a pH value of less 4 for at least 80% removal of mercury. In another embodiment, the solution has a pH between 2 and 3. In a third embodiment, the sodium hypochlorite solution has a pH of less than 2. A low pH favors the decomposition to produce $OCl^-$ ions.

In one embodiment, the oxidant is selected from the group of elemental halogens or halogen containing compounds, e.g., chlorine, iodine, fluorine or bromine, alkali metal salts of halogens, e.g., halides, chlorine dioxide, etc. In yet another embodiment, the compound is an iodide of a heavy metal cation. In yet another embodiment, the oxidant is selected from ammonium iodide, an alkaline metal iodide, and etheylenediamine dihydroiodide. In one embodiment, the oxidant is selected from the group of hypochlorite ions ($OCl^-$ such as $NaOCl$, $NaOCl_2$, $NaOCl_3$, $NaOCl_4$, $Ca(OCl^-)_2$, $NaClO_3$, $NaClO_2$, etc.), vanadium oxytrichloride, Fenton's reagent, hypobromite ions, chlorine dioxide, iodate $IO_3^-$ (such as potassium iodate $KIO_3$ and sodium iodate $NaIO_3$), and mixtures thereof In one embodiment, the oxidant is selected from $KMnO_4$, $K_2S_2O_8$, $K_2CrO_7$, and $Cl_2$.

In one embodiment, iodine is employed as the oxidizing agent. In this embodiment, the crude oil is first brought into contact with iodine or a compound containing iodine such as alkali metal salts of iodine, e.g., halides or iodide of a cation. In one embodiment, the iodide is selected from ammonium iodide, alkali metal iodide, an alkaline earth metal iodide, and etheylenediamine dihydroiodide.

In one embodiment, the oxidant is selected from the group of DEDCA (diethyl dithiocarbanic acid) in a concentration of 0.1 to 0.5M, DMPS (sodium 2,3-dimercaptopropane-1-sulfonate), DMSA (meso-2,3-dimercaptosuccinic acid), BAL (2,3-dimercapto-propanol), CDTA (1,2-cyclohexylene-dinitrilo-tetraacetic acid), DTPA (diethylene triamine pentaacetic acid), NAC (N-acetyl L-cystiene), sodium 4,5-dihydroxybenzene-1,3-disulfonate, polyaspartates; hydroxyaminocarboxylic acid (HACA); hydroxyethyliminodiacetic (HEIDA); iminodisuccinic acid (IDS); nitrilotriacetic acid (NTA), aminopolycarboxylic acids (such as ethylenediaminetetraacetic acid or EDTA), amino carboxylic acids (ethylenediaminotetraacetate, diethylenetriaminopentaacetate, nitriloacetate, hydroxyethylethylenediaminotriacetate), oxycarboxylic acids (citrate, tartrate, gluconate), and other carboxylic acids and their salt forms, phosphonates, acrylates, and acrylamides, and mixtures thereof.

Reducing Agent:

After the addition of the oxidant, the crude oil is brought into contact with at least a reducing agent. Examples of reducing agent include but are not limited to reduced sulfur compounds contain at least one sulfur atom in an oxidation state less than +6. (e.g., sodium thiosulfate, sodium or potassium bisulfite, metabisulfite, or sulfite); ferrous and ferric compounds include inorganic and organic ferrous compounds; stannous compounds which include inorganic stannous compounds and organic stannous compounds; oxalates which include oxalic acid, inorganic oxalates and organic oxalates; cuprous compounds include inorganic and organic cuprous compounds; organic acids decompose to form CO2 upon heating and act as reducing agents; nitrogen compounds include hydroxylamine compounds and hydrazine; sodium borohydride; diisobutylaluminium hydride (DIBAL-H); thiourea; a transition metal halide such as ferric chloride, zinc chloride, $NiCl_2$; $SO_2$ in $N_2$ or other inert gases, hydrogen; hydrogen sulfide; and hydrocarbons such as $CO_2$ and carbon monoxide.

In one embodiment, the reducing agent is selected from the group of inorganic ferrous compounds including but not limited to iron in the +2 oxidation state and inorganic ligands, e.g., Fe(II) chloride, Fe(II) oxide, potassium ferrocyanide, ferric and ferrous sulfates, ferric and ferrous carbonates, ferric chloride, and potassium ferricyanide. In another embodiment, the reducing agent is selected from organic ferrous compounds including but not limited to iron in the +2 oxidation state and carbon-containing ligands, e.g., ferrocene.

In one embodiment, the reducing agent is selected from the group selected from inorganic stannous compounds, including but not limited to tin in the +2 oxidation state and inorganic ligands. Examples are stannous chloride and stannous sulfate. In another embodiment, the reducing agent is selected from organic stannous compounds include tin in the +2 oxidation state and carbon-containing ligands, e.g., tin (II) ethylhexanoate In one embodiment, the reducing agent is selected from the group of inorganic oxalates such as ferric oxalate, ferrous oxalate, sodium oxalate, and half acid oxalates. In another embodiment, the reducing agent is an organic oxalate of the formula $RR'C_2O_4$ where R is an alkyl or aryl group and R' is hydrogen, an alkyl or aryl group. In yet another embodiment, the reductant is an organic acid selected from the group of formic acid, ascorbic acid, salicylic acid, tartaric acid, apidic acid.

Stripping of Volatile Mercury:

In one embodiment after the treatment of the crude to convert at least a portion of the mercury into a volatile strippable form, the mercury can be stripped from the treated crude using methods and equipment known in the art. In one embodiment, the mercury stripper may be as disclosed in U.S. Pat. Nos. 4,962,276 and 7,968,063, the disclosures of which are herein incorporated by reference in its entirety. The stripper can operate in counter current or co-current flow, e.g., in counter current flow with liquid flowing down and gas flowing up, wherein the stripping gas which includes the volatile mercury is withdrawn from the top of the stripper The stripping gas utilized in the process may be any of a number of gases including, for example, air, $N_2$, $CO_2$, $H_2$, methane, argon, helium, steam, air, natural gas, and combinations thereof In one embodiment, the stripping gas is a gas that originally contained mercury, but from which the mercury has been removed by an Hg adsorbent. In this fashion, a gas can be recycled between the treated crude and an Hg adsorbent, and the mercury in the crude transferred to the adsorbent.

The stripping operation is conducted at a temperature of less than 200° C. in one embodiment; less than 150° C. in a second embodiment; and les than 80° C. in a third embodiment. Upon mercury removal, the vapor can be condensed to recover the light hydrocarbons. The amount of gas used to strip the volatile mercury from the treated crude ranges between 0.01 and 1000 standard volumes of gas per volume of crude per minute in one embodiment; between 0.1 and 100 in a second embodiment; and between 1 and 50 in a third embodiment.

For a stripping operation in batch mode, mercury can be stripped from the treated crude in 0.01 to 10 hours in one embodiment; between 0.1 and 1 hour in a second embodiment. For a continuous flow operation, the LHSV of the crude in a stripper ranges between 0.01 and 10 $hr^{-1}$ in one embodiment; and between 0.1 and 1 $hr^{-1}$ in a second embodiment.

Hg Adsorber:

In one embodiment, a mercury adsorber or a scrubber is used to treat the stripping gas to remove mercury after it exits the stripper. In another embodiment with a treated crude having a low water content, e.g., less than 1 wt. %, a mercury adsorber is used to remove mercury from the treated crude.

The adsorber may include a fixed bed of active solid adsorbents, which consist of an active component with or without a support. The active component is present in an amount from 0.01 to 99.9 wt % of the combination of support and active component. The support can be carbon, aluminum, silicon, silica-alumina, molecular sieves, zeolites, and combinations. The active component can be any of the followings: a halogen (such as chlorine, bromine, or iodine) wherein the halogen can be in the zero valent, positive valent, or negative valent state, and used in conjunction with a support to form a solid; a sulfur compound (e.g., an inorganic or organic sulfide, an inorganic or organic sulfhydride, an inorganic or organic polysulfide, adsorbed hydrogen sulfide, and combinations thereof); a metal (e.g., copper, zinc, aluminum, silver, gold and combinations), wherein the metal can be in the zero valent state, as a hydroxide, as an oxide, as a sulfide, and combinations thereof); sulfur/carbon; Ag/carbon; $Ag/Al_2O_3$; $CuS/Al_2O_3$; CuS/carbon; $FeS/Al_2O_3$; FeS/carbon.

In one embodiment for the removal of mercury from the treated crude, the absorbing material is selected from the group of sulfur impregnated carbon (with adsorption capacity of 4,509 micro gram/gram of adsorbent), silver impregnated molecular sieve, copper oxides/sulfides, ozone-treated carbon surface (for a mercury adsorption capacity of carbon increase by a factor of 134), hydrous ferric oxide (HFO), hydrous tungsten oxide, and combinations thereof.

The adsorber is operated at a temperature between ambient and 200° C. in one embodiment; between 30 and 150° C. in a second embodiment; and between 40 and 125° C. in a third embodiment. The residence time in the adsorber ranges between 0.01 and 10 hr in one embodiment; and between 0.1 and 1 hr in a second embodiment.

In one embodiment, a polysulfide scrubbing system may alternatively be used to remove mercury from the stripping gas (unless the stripping gas is air). The mercury-containing stripping gas is passed through a scrubbing tower where it is scrubbed with a dilute alkali solution of $Na_2S_x$. The tower can be packed with structural packing, although a bubble cup or sieve tray could also be employed.

Methods for Removing Mercury by Converting to Volatile Form:

In one embodiment, the crude oil is first brought into contact with an oxidant (used interchangeably with "oxidizing agent"), then a reductant (used interchangeably with "reducing agent") is subsequently added for a "treated" crude with at least a portion of its mercury content being converted from a non-volatile to a volatile form. The time interval between the addition of the oxidant and reductant is less than 10 hours in one embodiment; less than 1 hour in a second embodiment; less than 15 minutes in a third embodiment; less than 5 minutes in a fourth embodiment; and simultaneous mixing/addition in yet another embodiment.

The temperature of the crude during the addition of the oxidant and reductant is at 200° C. or less in one embodiment; less than 100° C. in a second embodiment; and at ambient in a third embodiment.

The amount of oxidizing agent and reducing agent needed is determined by the effectiveness of the agents employed. The amount of oxidants/reductants used is at least equal to the amount of mercury in the crude on a molar basis (1:1), if not in an excess amount. In one embodiment, the molar ratio ranges from 5:1 to 50:1. In another embodiment, from 10:1 to 25:1. In one embodiment, the combined amount of oxidant and reductant is kept at less than 1 mole/bbl of crude. In another embodiment, the level is less than 0.5 mole of combined oxidant and reductant per barrel of crude.

In one embodiment, an amount of oxidants (and the water stream containing oxidants) is added for a molar ratio of oxidant to mercury ranging from 1.5:1 to 1000:1. In another embodiment, the volume ratio of water containing oxidant(s) to crude oil ranges from 0.05:1 to 5:1 in one embodiment; from 1:1 to 2:1 in a second embodiment; from 0.1:1 to 1:1 in a third embodiment; and at least 0.5:1 in a fourth embodiment. In one embodiment, the pH of the water stream or treatment solution containing the oxidizing is adjusted to a pre-selected pH, e.g., less than 6 in one embodiment; less than 5.5 in a second embodiment; less than 4 in a third embodiment; and less than 3 in a fourth embodiment.

In one embodiment after mixing with the oxidant and the reductant, at least 25% of the non-volatile mercury portion of mercury in a crude is converted to a volatile (strippable) form. In another embodiment, at least 50% of the non-volatile mercury is converted. In a third embodiment, at least 75%. In a fourth embodiment, at least 90%.

After the conversion of the non-volatile mercury to a volatile form, the crude oil in one embodiment is sent to a vessel to separate the treated crude into a gas stream containing most of the volatile mercury and a liquid stream with a reduced concentration of volatile as well non-volatile mercury. The reduced mercury concentration is less than 50% of the mercury originally in the crude in one embodiment, less than 25% of the original concentration in a second embodiment; less than 10% in a third embodiment; less than 5% in a fourth.

In another embodiment after the conversion of non-volatile mercury to volatile mercury, the crude oil is sent to a stripping unit with the addition of a stripping (carrier) gas for the removal of the volatile mercury into the stripping gas. The crude removed from the bottom of the unit in one embodiment contains less than 50% of the mercury originally in the crude (both volatile and non-volatile forms) in one embodiment.

After the removal of the mercury in the stripping unit, mercury can be further removed from the crude as well as the stripping gas rich in mercury using methods known in the art, as disclosed in US Patent Application Nos. 2010/0032344, 2010/0032345, and 2005/0167335, and U.S. Pat. Nos. 5,989,506 and 6,367,555, the disclosures of which are incorporated herein by reference in their entirety. In one embodiment, the stripping gas rich in mercury is sent to a fixed bed comprising a mercury adsorbent material, with the adsorbent material comprising an active component selected from the group of sulfur impregnated carbon, silver, copper oxides, ozone-treated carbon, hydrous ferric oxide, hydrous tungsten oxide, and combinations thereof. In another embodiment, mercury is removed from the stripping gas in a scrubbing system. By either scrubbing or adsorption, a treated gas stream with a reduced mercury content is produced with less than 10% of the mercury originally present in one embodiment; less than 5% of the mercury originally present in a second embodiment; and less than 1% of the mercury originally present in a third embodiment.

The treated gas stream in one embodiment is charged to a contactor along with the crude oil with a reduced concentration of volatile as well non-volatile mercury. In the contactor, at least a portion of the mercury is transferred from the liquid crude stream to the treated gas stream, thereby forming a mercury rich gas stream and a "treated" crude stream. The mercury rich gas stream can be directed to the adsorber unit/scrubbing unit as part of the feed for mercury removal.

The treated crude stream contains less than 10 ppbw in mercury in one embodiment; less than 5 ppbw mercury in another embodiment. In terms of original mercury concentration, the treated crude stream contains less than 10% of mercury initially present in the crude oil feed in one embodiment; less than 5% of mercury initially present in the crude oil feed in a second embodiment; and less than 1% of mercury initially present in the crude oil feed in a third embodiment.

EXAMPLES

The following examples are given to illustrate the present invention. It should be understood, however, that the invention is not limited to the specific conditions or details described in these examples.

Example 1

In this example, a sample of volatile $Hg^0$ in simulated crude was prepared. First, five grams of elemental mercury $Hg^0$ was placed in an impinger at 100° C. and 0.625 SCF/min of nitrogen gas was passed over through the impinger to form an Hg-saturated nitrogen gas stream. This gas stream was then bubbled through 3123 pounds of Supurla® white oil held at 60-70° C. in an agitated vessel. The operation continued for 55 hours until the mercury level in the white oil reached 500 ppbw by a Lumex™ analyzer. The simulated material was drummed and stored.

Example 2

The example illustrates the stripping of volatile $Hg^0$ from a crude.

75 ml of the simulated crude from Example 1 was placed in a 100 ml graduated cylinder and sparged with 300 ml/min of nitrogen at room temperature. The simulated crude had been stored for an extended period of time, e.g., months or days, and its initial value of mercury had decreased to about 375 ppbw due to vaporization (at time 0). The mercury in this simulated crude was rapidly stripped consistent with the known behavior of $Hg^0$, as shown in Table 1. The effective level of mercury at 60 minutes is essentially 0 as the detection limit of the Lumex™ analyzer is about 50 ppbw.

TABLE 1

| Time, min | Mercury, ppbw |
|---|---|
| 0 | 369 |
| 10 | 274 |
| 20 | 216 |
| 30 | 163 |
| 40 | 99 |
| 50 | 56 |
| 60 | 73 |
| 80 | 44 |
| 100 | 38 |
| 120 | 11 |
| 140 | 25 |
| Pct Volatile Hg | 80 |

Examples 3-5

Various samples of crudes from different sources were obtained, analyzed for particulate mercury using the modified BS&W test, and studied in the stripping test. In contrast to the simulated crude which used $Hg^0$, the mercury in these crudes is predominantly non-volatile and contains Hg particles. Crudes 1 & 2 had pour points above room temperature and were stripped at 60° C. Crude 3 was fluid at room temperature and was stripped at room temperature. Table 2 shows the results of the analyses.

TABLE 2

| Example 3 Crude 1 34% particulate Hg 60° C. | | Example 4 Crude 2 91% particulate Hg 60° C. | | Example 5 Crude 3 76% particulate Hg Ambient | |
|---|---|---|---|---|---|
| Time, min | Hg, ppbw | Time, min | Hg, ppbw | Time, min | Hg, ppbw |
| 0 | 444 | 0 | 6130 | 0 | 3361 |
| 10 | 397 | 10 | 6172 | 10 | 3334 |
| 20 | 407 | 20 | 5879 | 20 | 3329 |
| 30 | 405 | 30 | 6653 | 30 | 3539 |
| 40 | 432 | 40 | 6255 | 40 | 3303 |
| 50 | 427 | 50 | 6886 | 50 | 3710 |
| 60 | 398 | 60 | 6420 | 60 | 3539 |
| 80 | 413 | 80 | 6626 | — | — |
| 100 | 460 | — | — | — | — |
| 120 | 427 | — | — | — | — |
| 140 | 427 | — | — | — | — |
| 160 | 419 | — | — | — | — |
| 180 | 481 | — | — | — | — |
| Volatile Hg % | 10 | Volatile Hg % | 0 | Volatile Hg % | 0 |

Examples 6-9

Two additional crude samples, a condensate sample, and a commercially distilled naphtha sample were analyzed for particulates and volatile mercury in a method as described in Bloom, N. S., Analysis and stability of mercury speciation in petroleum hydrocarbons. Fresenius J Anal Chem. 2000, 366 (5) 438-443. Table 3 shows the results of the analyses.

TABLE 3

|  | Example 6 Condensate | Example 7 Crude 4 | Example 8 Crude 5 | Example 9 Distilled Naphtha |
|---|---|---|---|---|
| Hg Content, ppbw | 2,761 | 416 | 1,283 | 625 |
| Particulate Hg % | 92 | 52 | 99 | 0 |
| Volatile Hg % | 0.2 | 0.1 | 0.1 | 89 |

The mercury in the condensate and two crude samples was predominantly particulate and was predominantly non-volatile. In contrast, the mercury in the commercially distilled naphtha contained no particulate Hg wad was highly volatile. The mercury in this naphtha can be removed by use of an Hg Adsorbent. The properties of the Hg in the distilled naphtha are consistent with the properties of $Hg^0$.

Example 10

A control crude sample was prepared. First, 70 mL of crude oil was placed into a glass reactor with water jacket at 60° C. Mercury level in the oil was measured with Lumex™ Hg analyzer. $N_2$ was sparged rigorously into the oil sample at 30 CFM, and stirring was started at 600 rpm for 4 minutes. The agitator was stopped for 1 minute, followed by sampling for Hg measurement at intervals of 2, 5, 15, and 30 minutes with agitation in between. Results are shown in Table 4. Results indicate that the mercury present in the crude oil sample is predominantly in non-volatile (not removed by the stripping) with relatively constant amount of Hg concentration, although there is a slight increase in Hg concentration due to some stripping of light hydrocarbons.

Example 11

Addition of oxidation agent iodine to the crude oil was illustrated. Example 10 was repeated, with the addition of a pre-determined amount of 1% iodine ($I_2$) prep in Aromatic 150 into the reactor at a molar ratio of Hg to $I_2$ of 20 after the sparging of $N_2$. Stirring was started at 600 rpm for 4 minutes. The agitator was stopped for 1 minute, followed by sampling for Hg measurement at intervals of 1.5, 3, 5, 15, and 30 minutes with agitation in between. Results are shown in Table 4. The increase in Hg concentration over time can be attributed to variability of the measurement and/or removal of some light hydrocarbons by the stripping gas, causing an increase in Hg concentration.

Example 12

Addition of oxidation agent iodine and reductant $NaBH_4$ to the crude oil was illustrated. First, 30 mL of deionized water was placed into a glass reactor with water jacket at 60° C., and Hg level in water was measured. Next, 70 mL crude oil was placed into the glass reactor with water jacket 60° C., and Hg level in crude oil was measured. $N_2$ was sparged rigorously into the oil sample at 30 CFM. A pre-determined amount of 1% iodine ($I_2$) prep in Aromatic 150 was added to the reactor containing the oil sample at the molar ratio of Hg to $I_2$ of 20. Start stirring at 600 rpm for 4 min. Stop the agitator and add a pre-determined amount of 1% $NaBH_4$ prep in DI water into the reactor at the molar ratio of $NaBH_4$ to $I_2$ of 10. Agitator was started again then stopped at 1.5 min for sampling and measurement of Hg in crude oil and water, followed by sampling for Hg measurement at intervals of 3, 5, 15, and 30 min with agitation in between. Results of Hg measurements in water and oil samples taken at various intervals are also shown in Table 4. The results show that approximately 50% of the initial mercury was removed from the crude sample, with a fraction being transferred to the water phase and the remaining mercury was removed as volatile mercury by the stripping gas (with decreased concentration of mercury in the crude).

TABLE 4

| Example 10 Control - no additive | | Example 11 Oxidant $I_2$ | | Example 12 - Oxidant/Reductant | | | |
|---|---|---|---|---|---|---|---|
| | | | | WATER | | OIL | |
| minutes | Hg, ppbw | minutes | Hg, ppbw | minutes | Hg, ppbw | minutes | Hg, ppbw |
| Initial oil | 6643 | 0 | 6595 | Initial water | 0 | Initial oil | 6652 |
| 0 | 6643 | 4 min after $I_2$ | 7850 | 0 | 0 | 0 | 5391 |
| 2 | 7001 | 1.5 | 7227 | 1.5 | 183 | 1.5 | 4689 |
| — | — | 3 | 7209 | 3 | 318 | 3 | 3812 |
| 5 | 6440 | 5 | 6440 | 5 | 306 | 5 | 3559 |
| 15 | 6383 | 15 | 7685 | 15 | 671 | 15 | 3198 |
| 30 | 7556 | 30 | 8051 | 30 | — | 30 | 3308 |
| 60 | 7401 | — | — | — | — | — | — |

For the purposes of this specification and appended claims, unless otherwise indicated, all numbers expressing quantities, percentages or proportions, and other numerical values used in the specification and claims are to be understood as being modified in all instances by the term "about." Accordingly, unless indicated to the contrary, the numerical parameters set forth in the following specification and attached claims are approximations that can vary depending upon the desired properties sought to be obtained by the present invention. It is noted that, as used in this specification and the appended claims, the singular forms "a," "an," and "the," include plural references unless expressly and unequivocally limited to one referent.

As used herein, the term "include" and its grammatical variants are intended to be non-limiting, such that recitation of items in a list is not to the exclusion of other like items that can be substituted or added to the listed items. The terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof Unless otherwise defined, all terms, including technical and scientific terms used in the description, have the same meaning as commonly understood by one of ordinary skill in the art to which this invention belongs.

This written description uses examples to disclose the invention, including the best mode, and also to enable any person skilled in the art to make and use the invention. The patentable scope is defined by the claims, and can include other examples that occur to those skilled in the art. Such other examples are intended to be within the scope of the claims if they have structural elements that do not differ from the literal language of the claims, or if they include equivalent structural elements with insubstantial differences from the literal languages of the claims. All citations referred herein are expressly incorporated herein by reference.

The invention claimed is:

1. A method for reducing a trace amount of mercury in a crude oil, comprising:
   providing a crude oil having a first concentration of non-volatile mercury,
   mixing into the crude oil an effective amount of an oxidizing agent;

mixing into the crude oil an effective amount of a reducing agent to convert at least a portion of the non-volatile mercury into a volatile mercury;

removing the volatile mercury by at least one of stripping, scrubbing, adsorption, and combinations thereof to obtain a crude oil have a reduced concentration of non-volatile mercury which is less than 50% of the first concentration of non-volatile mercury.

2. The method of claim 1, wherein the crude oil has a first concentration of non-volatile mercury of at least 50 ppbw.

3. The method of claim 1, wherein the crude oil has a first concentration of non-volatile mercury of at least 100 ppbw.

4. The method of claim 1, wherein the crude oil has a first concentration of non-volatile mercury of at least 50 ppbw, and wherein the non-volatile mercury comprises at least 25% of total mercury present in the crude oil.

5. The method of claim 4, wherein the non-volatile mercury comprises at least 50% of total mercury present in the crude oil.

6. The method of claim 4, wherein the non-volatile mercury comprises at least 66% of total mercury present in the crude oil.

7. The method of claim 1, wherein at least 50% of the non-volatile mercury is converted to volatile mercury.

8. The method of claim 7, wherein at least 75% of the non-volatile mercury is converted to volatile mercury.

9. The method of claim 8, wherein at least 90% of the non-volatile mercury is converted to volatile mercury.

10. The method of claim 1, wherein the oxidizing agent is selected from the group of hydroperoxides, organic peroxides, inorganic peracids and salts thereof, organic peracids and salts thereof, molecular halogens, ozone and combinations thereof.

11. The method of claim 1, wherein the oxidant is iodine.

12. The method of claim 1, wherein the reducing agent is selected from the group of sodium borohydride, sodium metabisulfite ($Na_2S_2O_5$), sodium thiosulfate ($Na_2S_2O_3$), sulfite compounds, thiourea, halides of transition metals, potassium ferrocyanide, compounds containing $Sn^{2+}$ ion, $SO_2$ gas, oxalic acid, formic acid, hydroxylamine salts, hydrogen, diisobutylaluminium hydride, hydrogen sulfide, carbon monoxide, and combinations thereof.

13. The method of claim 1, wherein the reducing agent is sodium borohydride.

14. The method of claim 1, wherein the volatile mercury is removed from the crude oil by stripping in a stripping unit with a stripping gas selected from air, $N_2$, $CO_2$, $H_2$, methane, argon, helium, steam, natural gas, and combinations therof, to obtain a gas stream containing mercury and a crude stream having a reduced concentration of volatile mercury and non-volatile mercury.

15. The method of claim 14, further comprising:
removing mercury from the gas stream to provide a treated gas stream;
contacting the treated gas stream with the crude stream to transfer at least a portion of volatile mercury and non-volatile mercury from the liquid hydrocarbon stream to the treated gas stream and thereby form a treated crude stream and a mercury rich gas stream; and
passing the mercury rich gas stream to the stripping unit as part of feedstock to the stripping unit.

16. The method of claim 15, wherein mercury is removed from the gas stream in a fixed bed comprising a mercury adsorbent material.

17. The method of claim 16, wherein the mercury adsorbent material comprises an active component selected from the group of sulfur impregnated carbon, silver, copper oxides, ozone-treated carbon, hydrous ferric oxide, hydrous tungsten oxide, and combinations thereof.

18. The method of claim 15, wherein mercury is removed from the gas stream in a scrubbing system wherein the gas stream is passed scrubbed with a dilute alkali solution of $Na_2S_x$.

19. The method of claim 14, wherein the treated crude stream contains less than 10 ppbw in mercury.

20. The method of claim 14, wherein the treated crude stream contains less than 10% of mercury initially present in the crude oil.

21. The method of claim 14, wherein the treated crude stream contains less than 5% of mercury initially present in the crude oil.

22. The method of claim 14, wherein the treated crude stream contains less than 1% of mercury initially present in the crude oil.

23. In an improved process to removal mercury from a crude oil stream containing mercury, the process comprising:
a) providing a crude oil stream containing mercury from a crude oil well;
b) separating said crude oil stream into a gaseous hydrocarbon stream comprising hydrocarbons, mercury and water, and a liquid hydrocarbon stream comprising hydrocarbons and elemental mercury;
c) charging a mercury-containing gas feed, including in part at least a portion of said gaseous hydrocarbon stream, to a mercury removal unit for removal of mercury from said mercury-containing gas feed, thereby forming a treated gas stream;
d) contacting a recycle gas stream comprising a portion of said treated gas stream with at least a portion of said liquid hydrocarbon stream for transfer of at least a portion of the elemental mercury contained in said liquid hydrocarbon stream to said recycle gas stream; thereby forming a mercury rich gas stream, and a treated liquid hydrocarbon stream; and
e) passing said mercury rich gas stream to said mercury removal unit as a portion of said mercury-containing gas feed,
wherein the improvement comprises converting at least at portion of the mercury in the crude oil stream into volatile mercury, the improvement comprising:
mixing into the crude oil stream an effective amount of an oxidizing agent;
mixing into the crude oil stream an effective amount of a reducing agent to convert at least a portion of the mercury into a volatile mercury;
wherein the mixing into the crude oil stream is prior to separating the crude oil stream into a gaseous hydrocarbon stream and a liquid hydrocarbon stream.

24. In an improved process to removal mercury from a crude oil stream containing mercury, the process comprising:
a) separating the crude oil stream into a gaseous hydrocarbon stream and a liquid hydrocarbon stream;
b) removing mercury from the gaseous hydrocarbon stream to provide a treated gas stream;
c) contacting the treated gas stream with the liquid hydrocarbon stream to transfer mercury from the liquid hydrocarbon stream to the treated gas stream and thereby form a treated liquid stream and a mercury rich gas stream; and
d) removing mercury from the mercury rich gas stream,
wherein the improvement comprises converting at least at portion of the mercury in the crude oil stream into volatile mercury, the improvement comprising:

mixing into the crude oil stream an effective amount of an oxidizing agent;
mixing into the crude oil stream an effective amount of a reducing agent to convert at least a portion of the mercury into a volatile mercury;
wherein the mixing into the crude oil stream is prior to separating the crude oil stream into a gaseous hydrocarbon stream and a liquid hydrocarbon stream.

\* \* \* \* \*